(12) United States Patent
Blomme

(10) Patent No.: US 8,186,545 B2
(45) Date of Patent: May 29, 2012

(54) METERING VALVE COMPRISING A FIXED INNER CONDUIT AND A MOBILE OUTER SLEEVE

(75) Inventor: Karel Blomme, Evergem (BE)

(73) Assignee: Lesaffre Et Compagnie, Paris (FR)

( * ) Notice: Subject to any disclaimer, the term of this patent is extended or adjusted under 35 U.S.C. 154(b) by 542 days.

(21) Appl. No.: 12/066,826

(22) PCT Filed: Sep. 13, 2006

(86) PCT No.: PCT/FR2006/002100
§ 371 (c)(1),
(2), (4) Date: Jun. 11, 2008

(87) PCT Pub. No.: WO2007/031647
PCT Pub. Date: Mar. 22, 2007

(65) Prior Publication Data
US 2008/0302824 A1  Dec. 11, 2008

(30) Foreign Application Priority Data

Sep. 13, 2005 (FR) ...................................... 05 09345
Jun. 23, 2006 (FR) ...................................... 06 05621

(51) Int. Cl.
*B67D 3/00* (2006.01)

(52) U.S. Cl. ........ 222/180; 222/183; 222/509; 222/148; 251/336; 251/351

(58) Field of Classification Search .................. 222/148, 222/180, 183, 509, 518, 505, 181.1, 181.2, 222/181.3; 251/336, 337, 359
See application file for complete search history.

(56) References Cited

U.S. PATENT DOCUMENTS

| 2,689,669 | A | * | 9/1954 | Ericson ......................... 222/183 |
| 4,928,856 | A | * | 5/1990 | White ........................... 222/174 |
| 5,857,596 | A | | 1/1999 | Lee |
| 6,315,172 | B1 | * | 11/2001 | Till .............................. 222/400.7 |
| 7,311,224 | B2 | * | 12/2007 | Emmendoerfer et al. .... 222/129 |

FOREIGN PATENT DOCUMENTS

| DE | 299297 C | 7/1917 |
| EP | 0792930 B1 | 8/2002 |
| EP | 0792930 B2 | 12/2009 |
| FR | 2677007 A | 12/1992 |
| GB | 1 379 736 A | 1/1975 |
| GB | 2 046 709 A | 11/1980 |
| NL | 4872 C | 4/1919 |
| WO | WO2004/048253 A1 | 6/2004 |

* cited by examiner

*Primary Examiner* — J. Casimer Jacyna

(57) ABSTRACT

The invention concerns a valve (1) for measuring a liquid or powdery product, comprising a fixed conduit (5) for supplying the product; a closure (13) mounted at a lower end (11) of the conduit (5); and a coaxial sleeve (15), mounted outside the conduit (5), having a lower end (19) shaped into a valve seat, said sleeve (15) being mobile in translation relative to the conduit (5) between a so-called closed position wherein the valve seat (19) co-operates tightly with the closure (13), and a so-called open position wherein the valve seat (19) is spaced apart from the closure (13) to allow the product to flow.

20 Claims, 12 Drawing Sheets

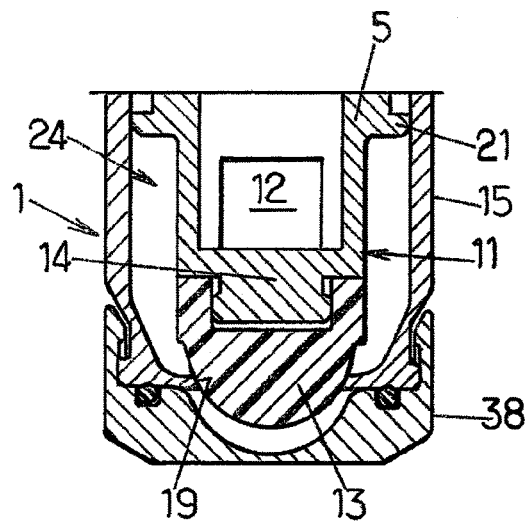
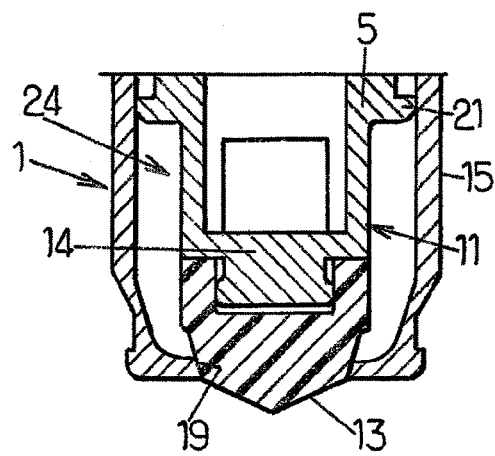
FIG.4.                FIG.5.
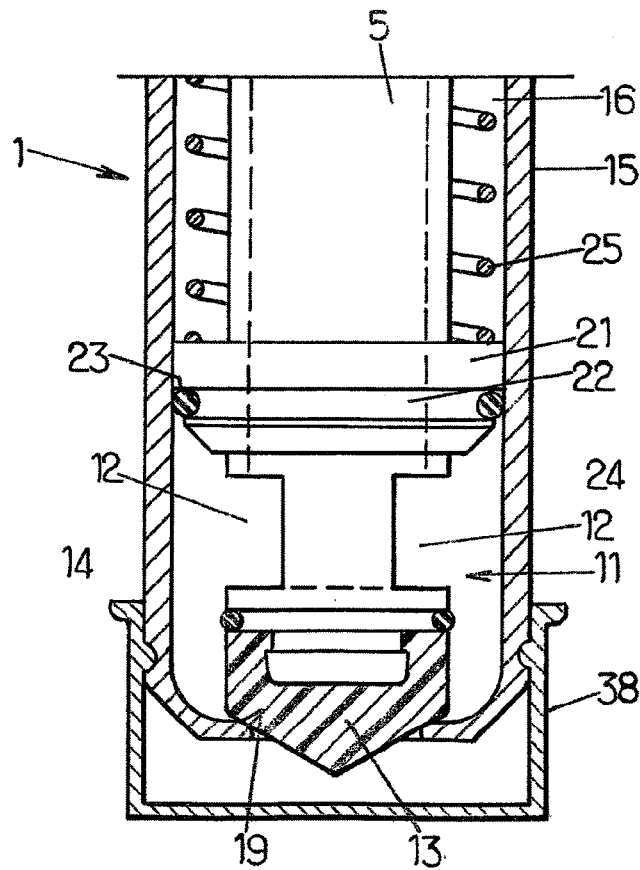
FIG.6.

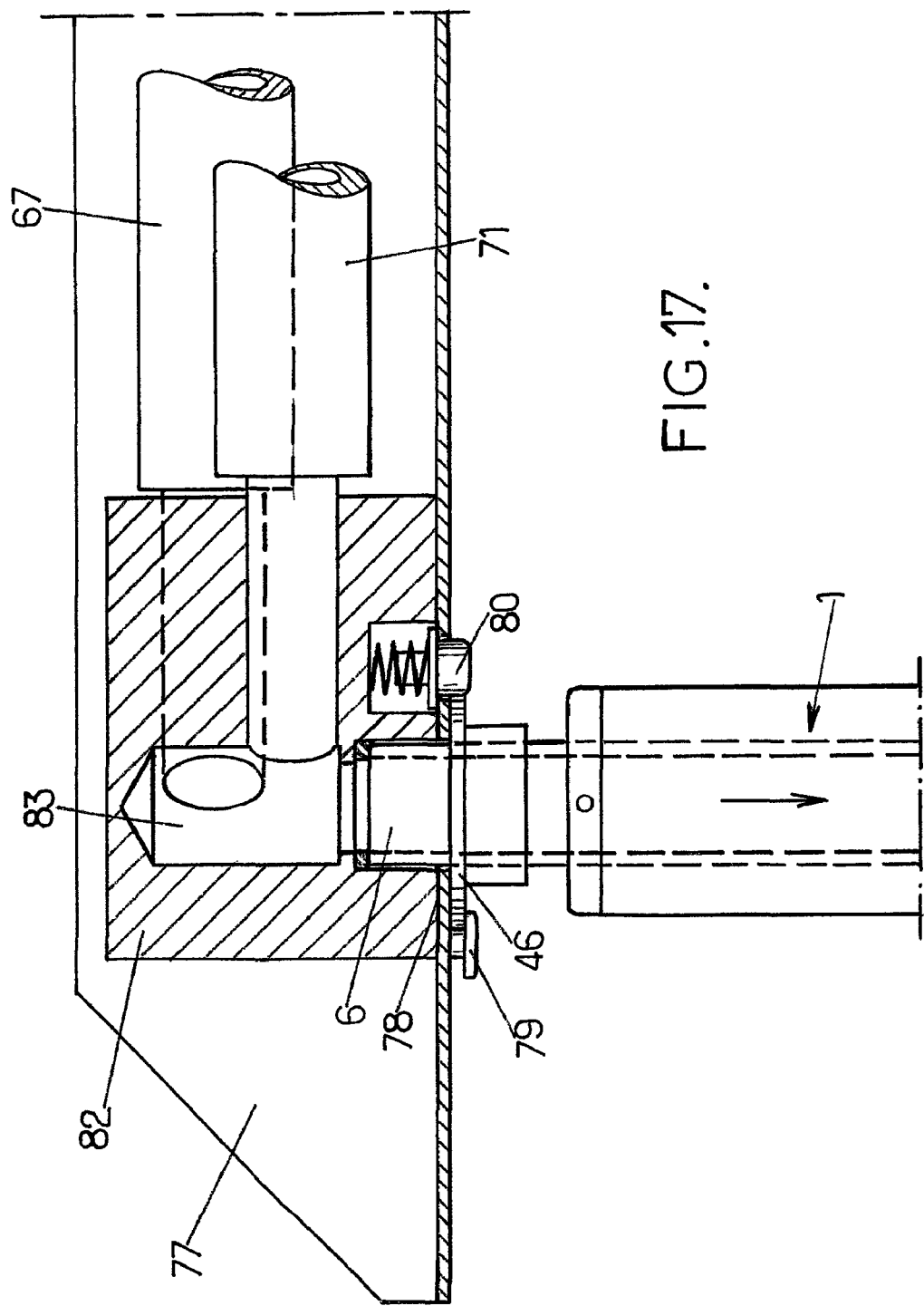

METERING VALVE COMPRISING A FIXED INNER CONDUIT AND A MOBILE OUTER SLEEVE

BACKGROUND OF THE INVENTION

The invention relates to valves for metering liquid (more or less viscous), or powdery products, some of which may actually exhibit dynamic flow behaviour similar to liquids.

Metering of such products appears to be necessary in many fields. In this case, the applicant was confronted in the field of bakery, with the problem of metering yeast as a liquid. Although this is the preferred field of application of the present invention, the latter cannot be limited to this field.

More particularly, the product to be metered may be a more or less thick yeast cream, this cream may notably be stable or stabilized, fresh, for example for use in bakery (the dry material content being for example comprised between 12 and 25%). This may also be a leaven as a liquid, a liquid (relatively viscous) yeast cream, a breadmaking enhancer as a liquid or powder after re-suspension. Combinations of such products may also be contemplated: this may thus be a yeast cream incorporating one or more breadmaking enhancers, such as enzymatic preparations, emulsifiers, etc.

Products of this type are presented in detail in the international application published under number WO 2004/048253 and in European patent EP0792930B1, and to which reference may be made.

As for powdery products, these may be a dry product comprising fine particles, of the dry yeast type (comprising from 90 to 95% of dry materials), or a breadmaking enhancer as a powder, the fluidity of which is sufficient for allowing it to be distributed through valves.

A metering valve of a known type presently used by the applicant is illustrated in FIG. 1 stated as "PRIOR ART". This valve, integrated to a device complying with the aforementioned international application WO 2004/048253, comprises at an upper end, an endpiece for its connection to tubing for feeding the liquid (mounted on a bag-in-box itself stored in a cooled compartment of a machine for dispensing yeast cream), this endpiece being fitted into a tubular flex, currently made in silicone, a lower end of which is capable of being nipped elastically, by a translationally displaceable finger, between a release position (in solid line) in which it leaves the flex open to allow flow of the liquid, and a closed-up position (in dotted lines) in which it is brought back elastically in order to nip the flex and thereby prevent flow.

This valve has been thoroughly tested and has the advantage of simplicity of design. Nevertheless, it was shown that under the action of friction and nipping exerted by the metering finger, early wear may result in perforation of the flex.

Further, it was also shown that a portion of the product adheres to the inner wall of the flex above the nipping area, to form a deposit which firstly affects the general hygiene of the valve (not only by promoting bacterial development, but also by attracting insects), and secondly causes yellowing of the flex (to the detriment of the aesthetical aspect), which flex has to be replaced too frequently.

The invention notably aims at finding a remedy to these problems, by proposing among other objects, a metering valve of a novel type, which i.a., has enhanced seal, hygiene and durability properties.

For this purpose, according to a first object, the invention provides a valve for metering a liquid or powdery product, which comprises:
- a fixed conduit for feeding the product, which has an upper end conformed as an endpiece for its connection to tubing for feeding the product, and a lower end for dispensing the product, this conduit defining at its lower end, an aperture for letting through the product;
- a closure member positioned at the lower end of the conduit;
- a coaxial sleeve mounted on the outside of the conduit, which has a lower end conformed as a valve seat, this sleeve delimiting together with the conduit, at its lower end, a chamber into which said aperture opens, said sleeve being translationally displaceable relatively to the conduit between a so-called closed position in which the valve seat tightly cooperates with the closure member, and a so-called open position in which the valve seat is spaced apart from the closure member in order to allow the product to flow.

In the closed position of the sleeve, the product is prevented from flowing. With the intimate contact between the closure member and the valve seat, leaks may be avoided, and a good seal of the valve and good hygienic conditions are thereby guaranteed.

According to a particular embodiment, the valve seat is frusto-conical, whereas the closure member is for example of a hemispherical shape (it may also be conical or frusto-conical); this closure member may be made in an elastomeric material (preferably of the type for food). This closure member may also comprise an O-ring seal positioned in a peripheral groove of the closure member. Such a closure member is advantageous notably in that it provides a better seal to the product to be metered under pressure.

Moreover, a return spring is preferably provided for permanently urging the sleeve towards its closed position.

According to an embodiment, the chamber is delimited firstly by the valve seat and secondly by a seal ring, interposed between the conduit and the sleeve.

A bayonet mechanism may further be provided in order to ensure blocking of the sleeve in the open and/or closed position; this bayonet mechanism for example comprises a lug which cooperates with an angled groove.

According to a second object, the invention provides a device for metering a liquid or powdery product, which comprises a valve of the type described above and means for actuating this valve.

These means for actuating the valve for example comprise a fixed plate which may be provided with means for positioning the valve, and an actuation lever, pivotally mounted on the plate and which cooperates with the sleeve to control its displacement relatively to the conduit.

According to an embodiment, the lever has a flared notch by which the conduit may be introduced in order to ensure positioning of the endpiece relatively to the plate. The lever is preferably designed so as to be able to adopt a so-called "non operational" position in which it is spaced apart from the sleeve.

According to a third object, the invention provides a machine for dispensing a liquid or powdery product, which comprises:
- a fixed structure provided with a compartment,
- an interchangeable reservoir, positioned in said compartment and containing said product, this reservoir being provided with tubing for the flow of the product, and
- a metering device as described above,
- in which the valve is connected on said reservoir, its conduit being connected to the tubing via its endpiece, whereas the actuation means are mounted on the fixed structure.

According to a fourth object, the invention provides a machine for dispensing a liquid or powdery product, which comprises:
- a fixed structure provided with a compartment and having a notch for introducing the valve,
- an interchangeable reservoir, positioned in said compartment and containing said product, this reservoir being provided with tubing for the flow of the product, and
- a metering device according to the embodiment described above,
- a machine in which the plate is mounted on the fixed structure in the vicinity of the notch, and in which the valve is set into place on the fixed structure while being positioned in the notch and connected onto said reservoir, its conduit being connected to the tubing via its end piece.

According to a fifth object, the invention provides an installation for dispensing a liquid product which includes:
- a container containing said liquid product;
- means for dispensing a liquid product, connecting the container to the metering valve having features like those mentioned earlier;
- a pump with which the liquid product of the container may be withdrawn and said liquid product may be circulated in the liquid product dispensing means;
- a metering device with the features described earlier.

According to a preferential embodiment, and in order to allow a liquid product circulation loop to be formed, the liquid product dispensing means comprise a return conduit starting from upstream of the metering valve and opening out either into the container, or into a secondary conduit.

According to a preferential embodiment, and in order to allow cleaning of the conduits in which the liquid product flows, the installation comprises a reservoir of cleaning solution capable of cleaning the means for dispensing the liquid product.

According to a preferential embodiment, and in order to allow a cleaning loop to be formed which passes through the metering valve, the installation comprises a flexible connecting pipe capable of being connected onto the valve.

According to a preferential embodiment, the flexible connecting pipe opens out either into the cleaning solution reservoir, or into a connecting point provided on the return conduit, in a conduit opening out into the cleaning solution reservoir. An advantageous installation according to the invention may comprise one or more of these preferential embodiments, i.e., the conduit for returning the liquid product to be metered, a cleaning solution reservoir and/or the flexible connecting pipe.

An installation according to the invention may further comprise one or more metering devices in parallel, with or without a cleaning loop, and with or without a loop for returning the liquid product into the container.

An installation comprising several metering devices, a cleaning loop for cleaning the valves in series and a loop for returning liquid product into the container, is particularly advantageous in that it allows a same cleaning flow rate in the whole installation.

Advantageously, the secondary conduit opens out into the cleaning solution reservoir.

The object of the invention is also the use of the metering valve and/or the metering device and/or the dispensing machine and/or the dispensing installation as described earlier, in bakeries, and more particularly for metering the bakeries' liquid yeast cream.

Other objects and advantages of the invention will become apparent in the light of the description made hereafter with reference to the appended drawings.

BRIEF DESCRIPTION OF THE DRAWINGS

FIG. 4 is a partial elevational sectional view more specifically showing the lower portion of the valve of FIG. 3;

FIG. 5 is a view analogous to FIG. 4, according to an alternative embodiment;

FIG. 6 is a view analogous to FIG. 5, according to another alternative embodiment;

FIG. 17 is a schematic sectional view of an embodiment of the means for letting the liquid product flow into the valve integrated to an installation such as the one described in FIG. 13.

DETAILED DESCRIPTION OF PREFERRED EMBODIMENTS

Figure 1:
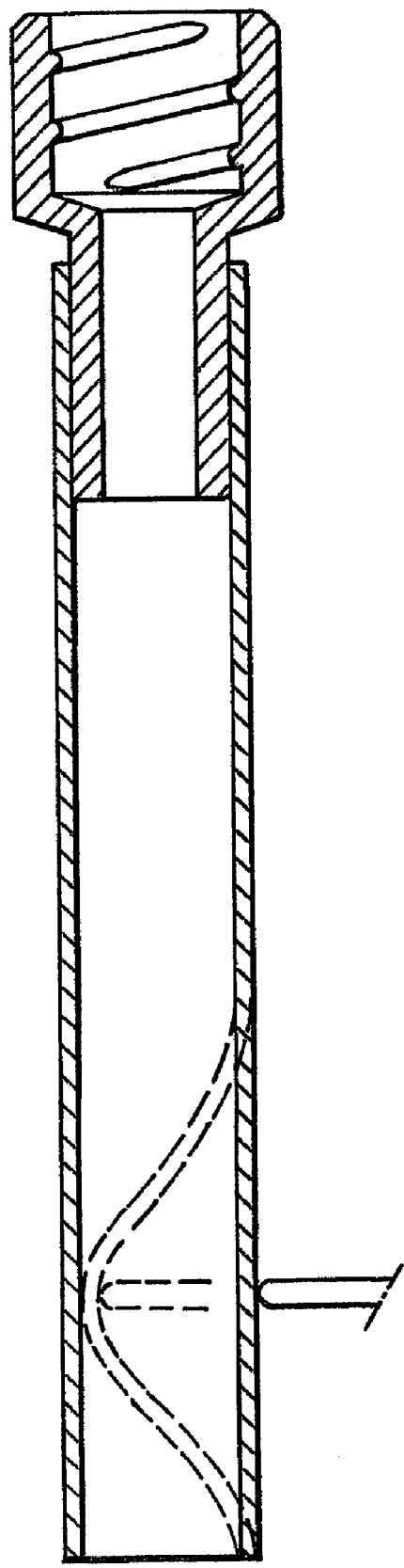
FIG. 1 is an elevational sectional view showing a metering valve according to the prior art.

In the figures, a metering valve 1 is illustrated, particularly suitable for dispensing a liquid product, preferably a liquid yeast, such as a yeast cream, but which is also suitable for dispensing a powdery product (for example yeast or leaven in a dry form, etc.).

This valve 1 forms the first portion of a metering device 2, the other portion of which having the function of actuating the valve 1, will be described in more detail hereafter. This device is for example intended to be mounted on a frame 3 of a machine 4 for dispensing the product to be metered, a machine 4 which will also be described in more detail hereafter. Alternatively, this device may also be mounted on the lower surface of a supporting arm 77 of a metering installation also described hereafter in more details in FIG. 17.

Figure 3:
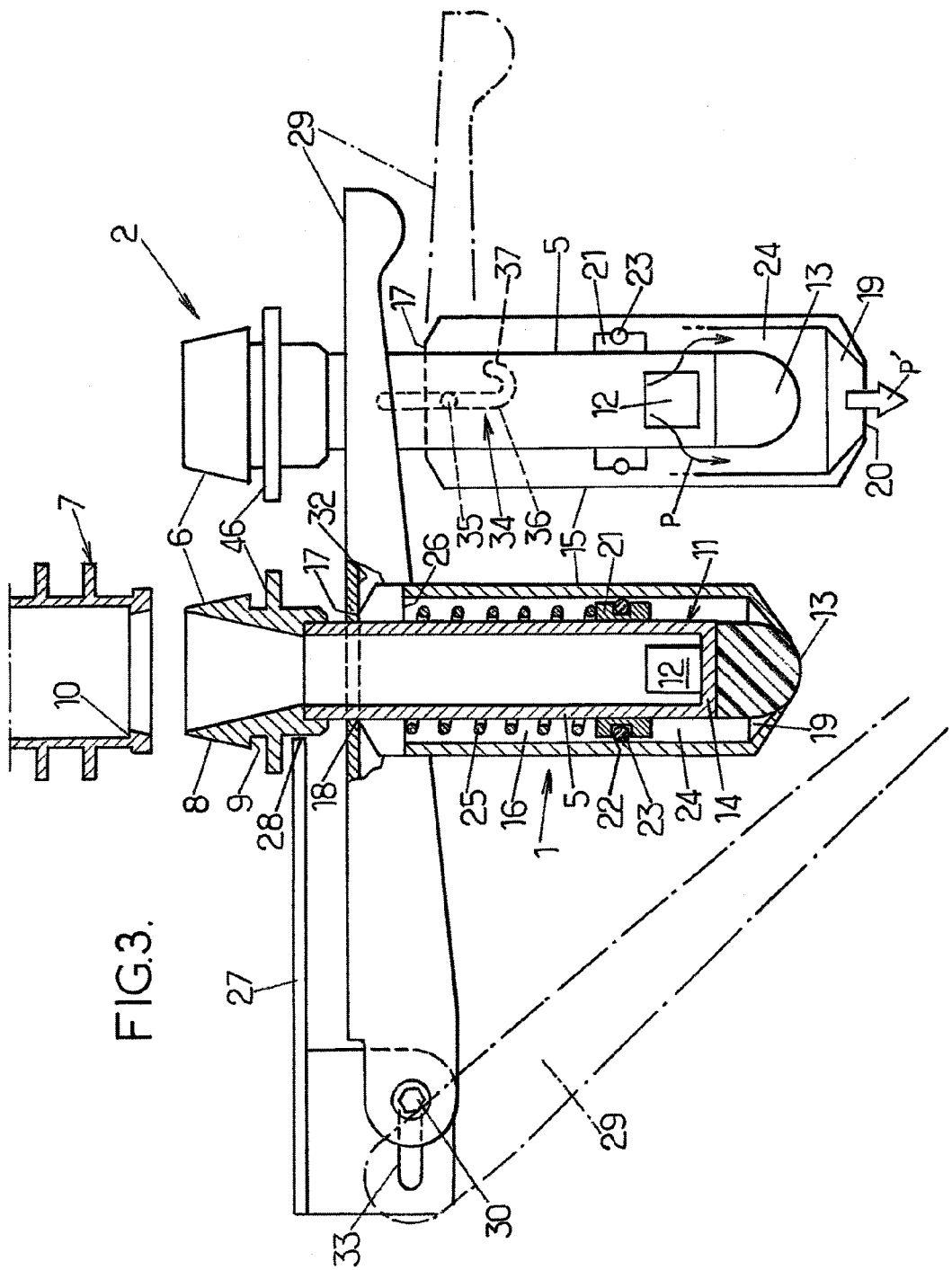
FIG. 3 is an elevational sectional view showing the metering device of FIG. 2 with the metering valve in the closed position and, more schematically illustrated, offset to the right, the valve in the open position.

The valve 1 first comprises a tubular conduit 5 for feeding the product, attached relatively to the frame 3. This conduit 5 has an upper end 6, conformed as an endpiece (either in a single piece, or added on as illustrated in FIG. 3) for its connection to preferably flexible tubing 7 for introducing the product. This connection may be achieved by screwing or by force-fitting the endpiece 6. However, according to a preferred embodiment illustrated in FIG. 3, this connection is achieved by a detent mechanism, the endpiece 6 having a conical portion 8 defining a shoulder 9 which engages with a complementary spot facing 10 made at a lower end of the product feed tubing 7. According to an alternative embodiment illustrated in FIG. 17, this connection is achieved by driving in and fixing the endpiece 6 into the orifice 78 of the supporting arm 77 as this will be described in FIG. 17.

The conduit 5 moreover has a lower end 11 for dispensing the product, opposite to the upper end 6 and at which the conduit 5 defines at least one aperture 12, consisting of a lateral cut-out, for letting through the liquid (as illustrated by the arrows P of FIG. 3). According to a preferred embodiment, two diametrically opposite apertures are made in the conduit 5.

The valve 1 also comprises a closure member 13 mounted to the lower end 11 of the conduit 5. This closure member 13 according to a first embodiment, appears as a hemispherical elastomeric seal preferably suitable for use with foods (for example in natural rubber or in a synthetic elastomer, for example based on polyurethane or silicone), added on, fixed (preferably by a detent mechanism, as illustrated in FIGS. 4 and 6, but this may be by adhesive bonding) on an end transverse wall 14 of the conduit 5, adjacent to the aperture 12.

Alternatively, the closure member 13 is made in a metal material, the surface of which is preferably polished for sealing reasons. The closure member 13 may comprise an O-ring seal (not shown) notably for a better seal under pressure. This seal is then positioned in a groove peripheral to the closure member (not shown) in contact with the internal wall of the valve 6 of the layer end 19 when the valve is in the closed position.

The valve 1 further comprises a sleeve 15, mounted to the outside of the conduit 5, also cylindrical and coaxial with the latter, which has an inner diameter larger than the outer diameter of the conduit 5, so that an annular space 16 is provided between the conduit 5 and the sleeve 15.

The sleeve 15 has at an upper end, a shoulder 17, as well as a circular aperture 18 adjusted (with play) to the outer diameter of the conduit 5. The sleeve 15 also has an opposite lower end 19 conformed as a valve seat, defining an aperture 20, and the function of which will appear hereafter.

As this is illustrated in FIG. 3, the conduit 5 is provided, at a certain distance from its lower end 11, with a seal ring 21, preferably made by machining in the bulk of the conduit 5. This ring 21 forms a collar extending transversely into the space 16 between the conduit 5 and the sleeve 15, and includes a peripheral groove 22 in which an O-ring seal 23 is positioned, in contact with the internal wall of the sleeve 15. The ring 21, possibly via the seal 23, ensures together with the aperture 18, guiding of the sleeve 15 relatively to the conduit 5 and adjustment of the closure member 13 on the valve seat 19.

The sleeve 15 delimits together with the conduit 5, at the its lower end 11, and more specifically between the valve seat 19 and the seal ring 21, a substantially annular chamber 24 into which the aperture 12 opens out, the chamber 24 being thereby filled with pressurized liquid. This pressure, measured relatively, is in practice less than 10 bars. It is preferably less than 5 bars and even preferentially less than 1 bar.

As this is illustrated in FIG. 3, the sleeve 15 is mounted so as to be displaceable in an axial translation (i.e. parallel to the axis of the conduit 5) relatively to the conduit 5, between a high so-called closed position (on the left of FIG. 3) in which the valve seat 19 tightly cooperates with the closure member 13 in order to prevent the liquid from flowing from the chamber 24, and a low so-called open position (on the right of FIG. 3), localized under the closed position and in which the valve seat 19 is spaced apart from the closure member 13 in order to allow liquid to flow through the aperture 20, via the chamber 24 (arrow P' in FIG. 3).

In order to facilitate sliding of the sleeve 15 relatively to the conduit 5, the seal gasket 23 may be coated with a layer of Teflon® (polytetrafluoroethylene).

The sleeve 15 is permanently urged towards its closed position by a compression spring 25, positioned in the space 16 between the conduit 5 and the sleeve 15, and axially interposed between the seal ring 21 and a shoulder 26 made at the upper end 18 of the sleeve 15. This shoulder 26 is for example formed by a screwed-on ring at the upper end of the sleeve 15.

As this is visible in FIGS. 2 and 3, and 7 to 9, the metering device 2 in addition to the valve 2, comprises actuation means consisting of a fixed portion called a plate 27, mounted on the frame 3 (for example as this is notably illustrated in FIG. 2 via a dovetailed base 27', directly screwed into the frame 3 and into which the plate 27 will slide), and which may have at one end a cut-out 28 capable of receiving the endpiece 6 in order to provide accurate positioning of the valve 1 relatively to the frame 3.

The actuation means further comprise a mobile portion, formed by an actuation lever 29 pivotally mounted on the plate 27 around a transverse axis 30 and which controls the displacement of the sleeve 15.

More specifically, the lever 29 has, at an end opposite to its axis 30 of rotation, a flared notch 31 (FIGS. 2, 8 and 9) which allows the valve 1 to be introduced during its (removable) placement. This notch 31 has two constrictions 32 which, once the valve 1 is introduced completely into the notch 31, are supported against the shoulder 17 of the sleeve 15. In this way, manoeuvring of the lever 29 from a high position (in solid lines in FIG. 3) towards a low position (in dot and dash lines on the right in FIG. 3) causes the displacement of the sleeve 15 from its closed position in which the product flow is blocked, towards its open position, in which flow of the product is allowed.

Figure 9:
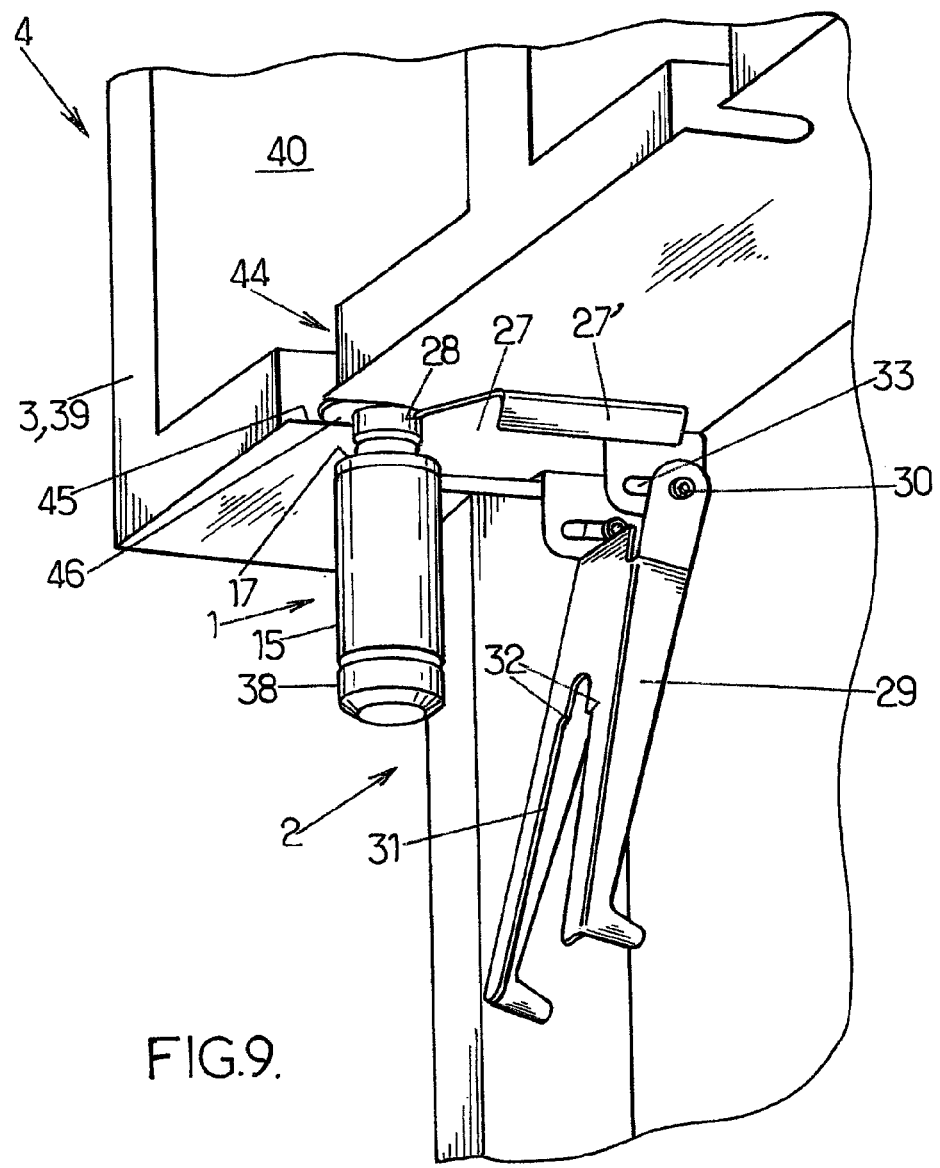
FIG. 9 is a perspective detailed view, from the bottom, of the metering device of FIG. 8 mounted on the dispensing machine.

As this is also illustrated in FIGS. 3 and 9, the lever 29 may adopt a third position, a so-called "out-of-order" position (in dot and dash lines, on the left in FIG. 3), in which the lever 29 freely hangs downwards, substantially perpendicularly to the plate 27. This position may be adopted by the lever 29 in spite of the presence of the valve 1 by means of an oblong hole 33 in which the joint axis 30 of the lever 29 is mounted, and which allows displacement of the latter (preferably against a restoring spring, not shown) in a plane perpendicular to the axis of the valve 1, in a pushed-back position (in dotted lines in FIG. 2) where the constrictions 32 are spaced apart from the shoulder 17, and where the spacing between the edges of the notch 31 is larger than the outer diameter of the sleeve 15, which thereby allows the lever 29 to freely pivot downwards without the latter abutting against the shoulder 17. In this "out-of-order" position of the lever 29, placement and removal of the valve 1 are facilitated.

As this is illustrated in dotted lines on the right in FIG. 3, a bayonet mechanism 34 may be provided in order to ensure blocking of the sleeve 15 in the open position and thereby allow the valve 1 to be emptied and cleaned. This mechanism 34 for example comprises (as illustrated) a lug 35, mounted transversely on the internal wall of the sleeve 15 in the upper portion of the latter, which cooperates with an oblong groove 36 made at the outer surface of the conduit 5 in a portion of the thickness of the latter, and which has at a lower end, a curved portion 37 for ensuring (by means of a slight rotation of the sleeve 15) blocking of the lug 36 in the open position of the sleeve 15.

Such a bayonet mechanism 34 may also be provided for ensuring blocking of the sleeve 15 in the closed position (for example preventing it from opening untimely). In this case, the oblong groove 36 will for example be provided with a bend at its upper end, provided at right angles (or slightly obtuse angles, for example about 95°, in order to allow compensation of the wear play between the closure member 13 and the seat 19), in which the lug 35 will be positioned, in the closed position of the sleeve 15.

As this is visible in FIGS. 4, 5 and 6, the closure member 13 may have a spherical shape (FIG. 4), as described earlier. But, alternatively, it may also have a frusto-conical shape (FIG. 5) or even conical (FIG. 6).

In the closed position, the intimate contact between the closure member 13 and the valve seat 19, preferably of frusto-conical shape, ensures a perfect seal between the conduit 5 and the sleeve 15, which avoids any leak of product. Taking into account its spherical or conical shape at its end, the closure member 13 allows substantially laminar flow of the product and limits the risk of stagnation of a significant amount of the latter on the closure member 13 in the closed position of the sleeve 15. A result of this is a significant improvement in hygiene as compared with a conventional valve as presented in the introduction. As indicated earlier, this seal may be reinforced by the presence of an O-ring (not shown) positioned in a groove (not shown) at the periphery of the closure member.

Metering of the liquid (in other words controlling its flow rate) depends on the position of the sleeve 15 relatively to the conduit 5, and therefore depends on the position of the lever 29. When the lever 29 is manoeuvred manually, the metering of the liquid is therefore left to the appreciation of the user.

However, it is alternatively possible to subordinate the manoeuvring of the lever 29 to an automatic control, for example a hydraulic, pneumatic or even electric control.

Flow of the liquid preferentially is accomplished by a combination of gravity and of the pressure of the liquid in the conduit 5 (i.e. in the chamber 24), but in the case of a liquid at atmospheric pressure, or a powdery product, flow is accomplished exclusively by gravity.

As for the materials, the conduit 5, including its endpiece 6, as well as the sleeve, are preferably made in a metal material (for example stainless steel of the type for food), or in a hard plastic material of the type for food (such as polycarbonate or even nylon). These products are not likely to be degraded by possible stagnation.

Figure 2:
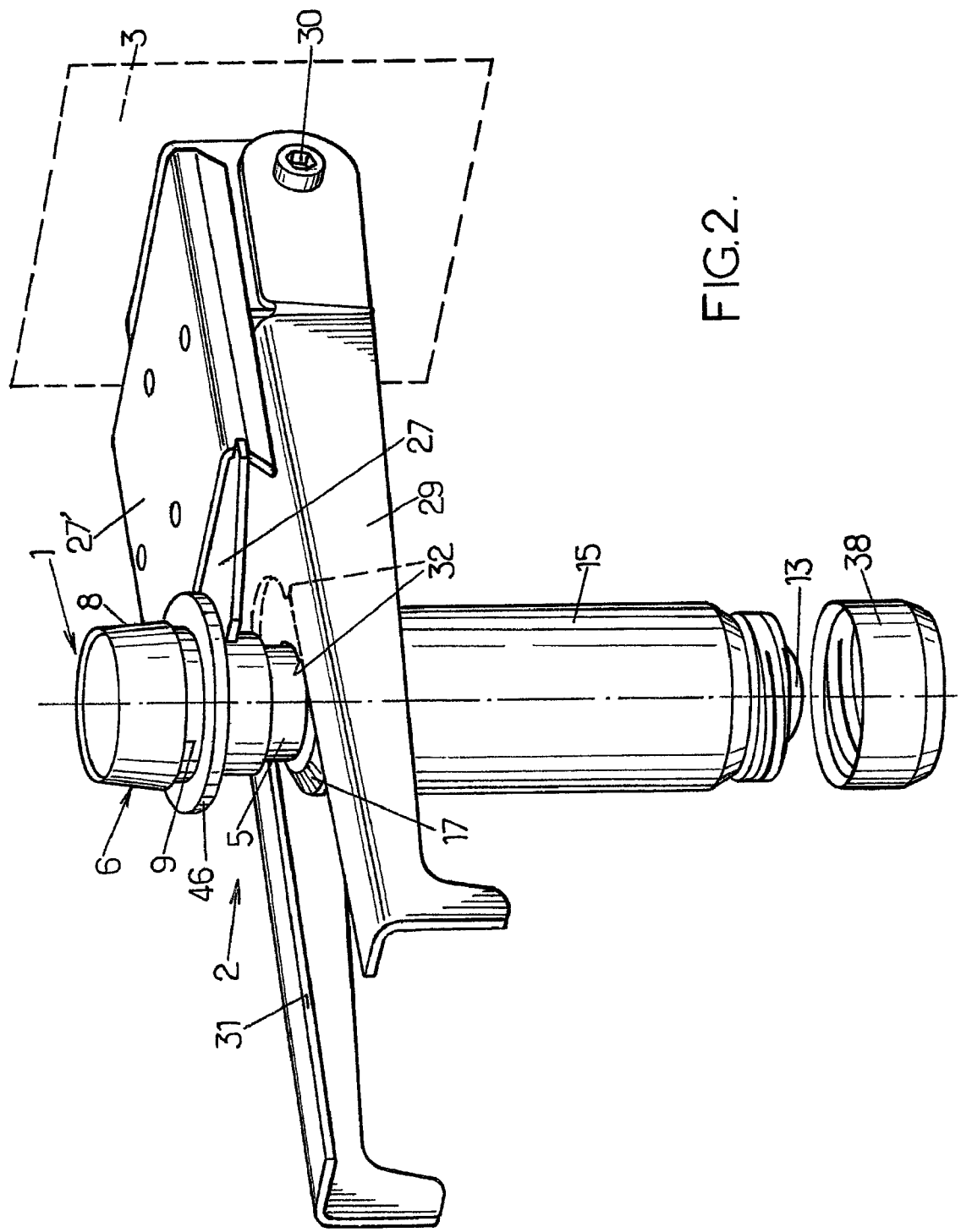
FIG. 2 is a perspective view showing a metering device according to the invention.

Further, and as illustrated in FIGS. 2, 4 and 6, the valve 1 may be closed, during the operations for mounting or removing the valve body 3, by a plug 38 which will be screwed in or snapped in (as illustrated in FIGS. 4 to 6) on the lower end 19 of the sleeve in order to seal the latter. This plug 38 may also be replaced with a connector with which the valve 1 may be connected to a bypass circuit, in particular in order to achieve a cleaning loop, and as this will be described later on. For hygienic purposes, it is also possible to take advantage of the plug 38 for cleaning the lower end of the valve 1, either by extended contact with a solution for cleaning the closure member 13, or by having this solution flow in the plug 38. For this purpose, the plug 38 may be pierced with holes for injecting and discharging the cleaning solution.

Figure 7:
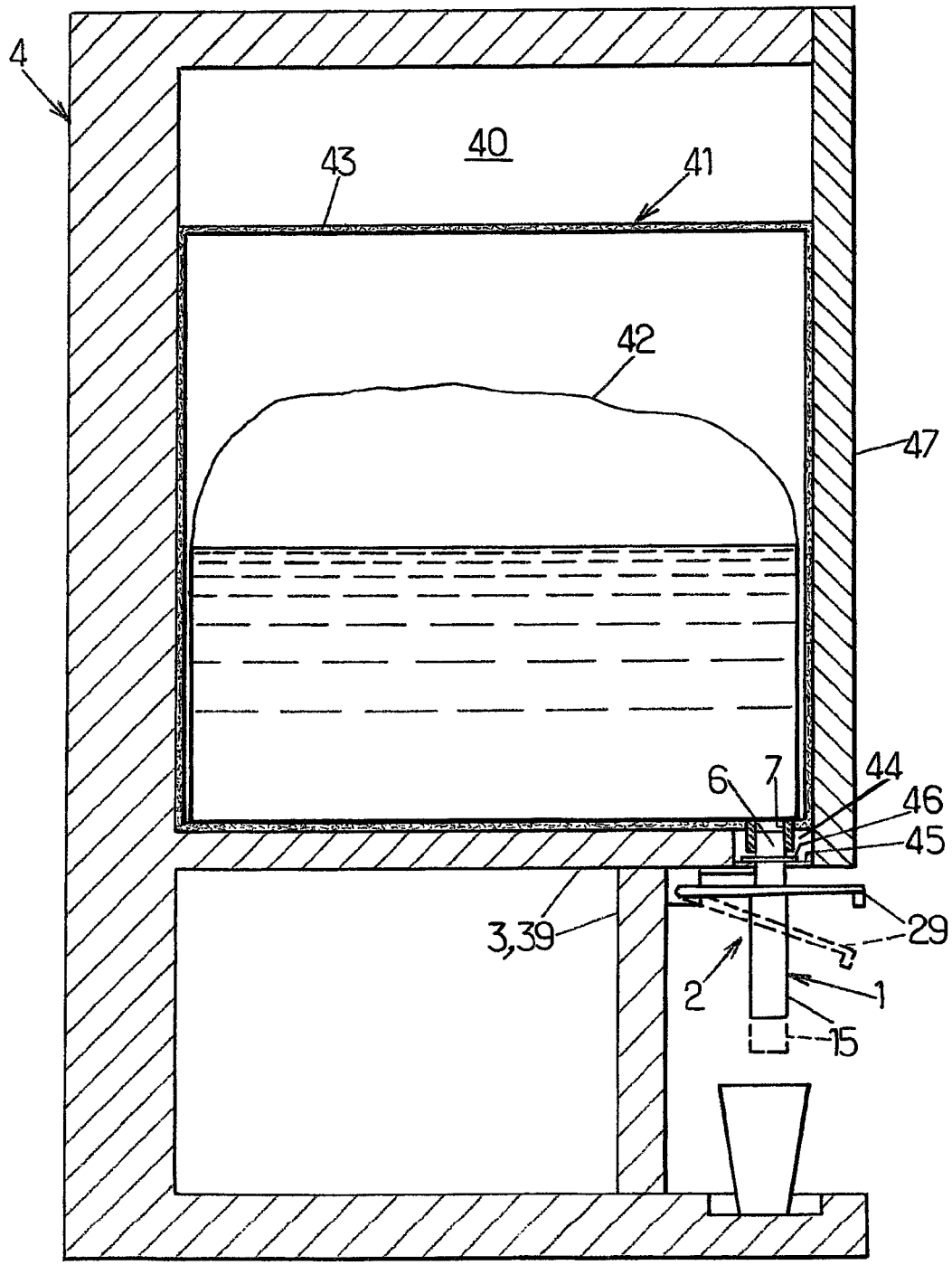
FIG. 7 is an elevational sectional view showing a machine for dispensing a liquid or powdery product, according to the invention, integrating a valve for metering said product.
Figure 8:
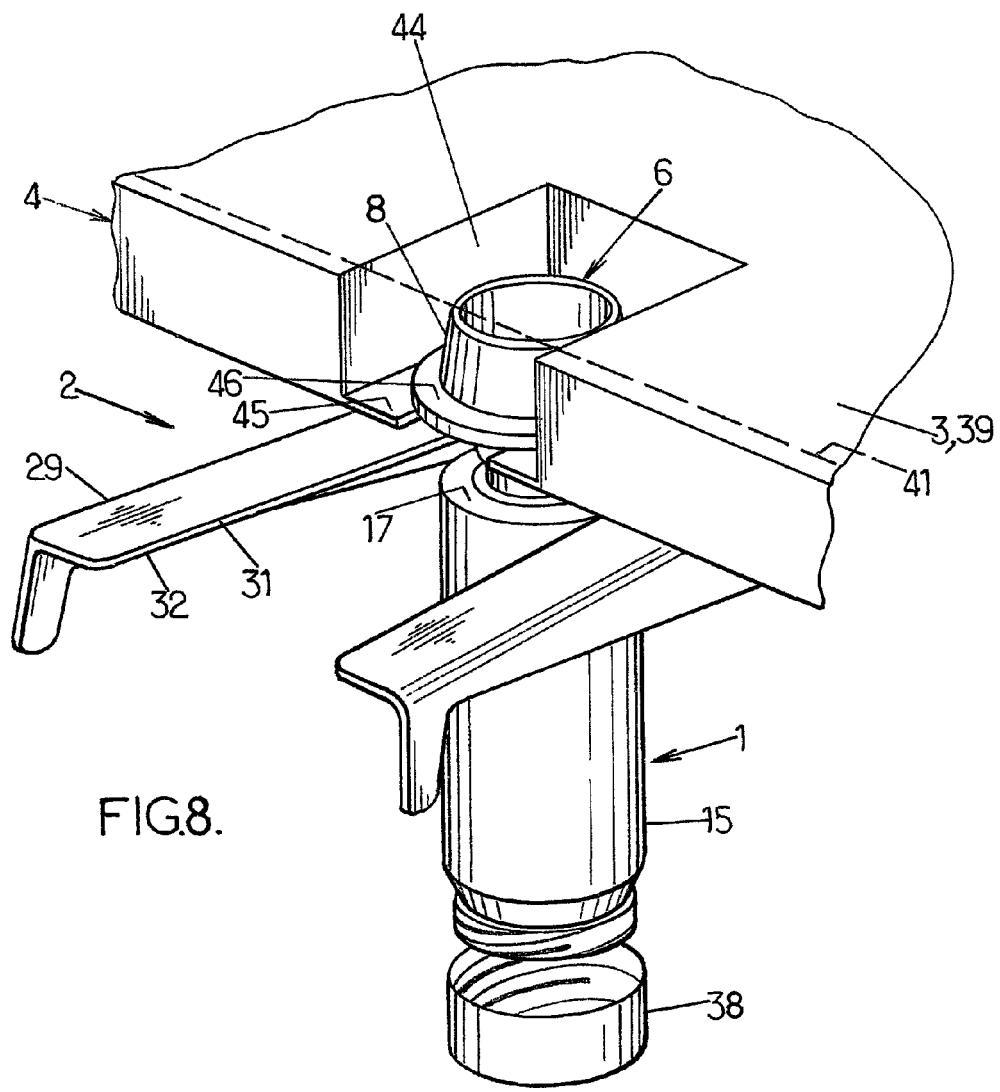
FIG. 8 is a perspective detailed view from the top, of a metering device integrating a metering valve as notably illustrated in FIG. 2, and fitting out a dispensing machine as illustrated in FIG. 7.

As this is illustrated in FIGS. 7, 8 and 9, the metering device 2 is intended to be mounted on the frame 3 of a machine 4 for dispensing the product.

This machine 4 comprises a fixed structure 39 which forms the frame 3 mentioned above, this fixed structure 39 being provided with a cooled compartment 40, as well as an interchangeable reservoir 41 as a flexible and deflatable bag-in-box 42 containing the product to be metered, this bag-in-box 42 being received in a rigid box 43 (for example in cardboard) positioned in the compartment 40.

The bag-in-box 42 is provided with tubing 7 for the flow of the product, this tubing opening out, downwards, when the reservoir 41 is properly positioned in the compartment 40, in a notch 44 provided in the frame 3 for placing the valve 1.

More specifically, as this is visible in FIGS. 8 and 9, the frame 3 has, on a lower edge of the notch 44, a spot facing 45 on which the valve 1 rests via a collar 46 formed radially on the endpiece 6.

In the same way, the plate 27 is mounted on the fixed structure 39 in the vicinity of the notch 44, slightly retracted relatively to the latter, so that the cutout 28 is at the base of the latter and the lever 29 juts out from the fixed structure 39 so that it may be manoeuvred.

Once the plate 27 is in place, the valve 1 is mounted as follows. One begins by connecting it to the reservoir 41 by connecting its conduit 5 to the tubing 7 via the endpiece 6. This operation is carried out with the tubing 7 lying upwards, in order to avoid any untimely flow of the product. Next the reservoir 41 is turned upside down and introduced sideways into the compartment 40 by making sure that the valve 1 will slide into the notch 44, its accurate positioning being ensured by the cut-out 28 into which the endpiece 6 will fit. The placement of the valve 1 on the fixed structure 39 may be carried out either in the high position, or in the "out-of-order" position of the lever 29. Once the valve 1 is in position, the compartment 40 is closed by a door 47.

It should be noted that the cold which prevails in the compartment 40 for preserving the product (for example when this is a yeast cream, a highly perishable foodstuff) is transmitted by conduction to the valve 1 via the tubing 7 and the endpiece 6.

Figure 10:
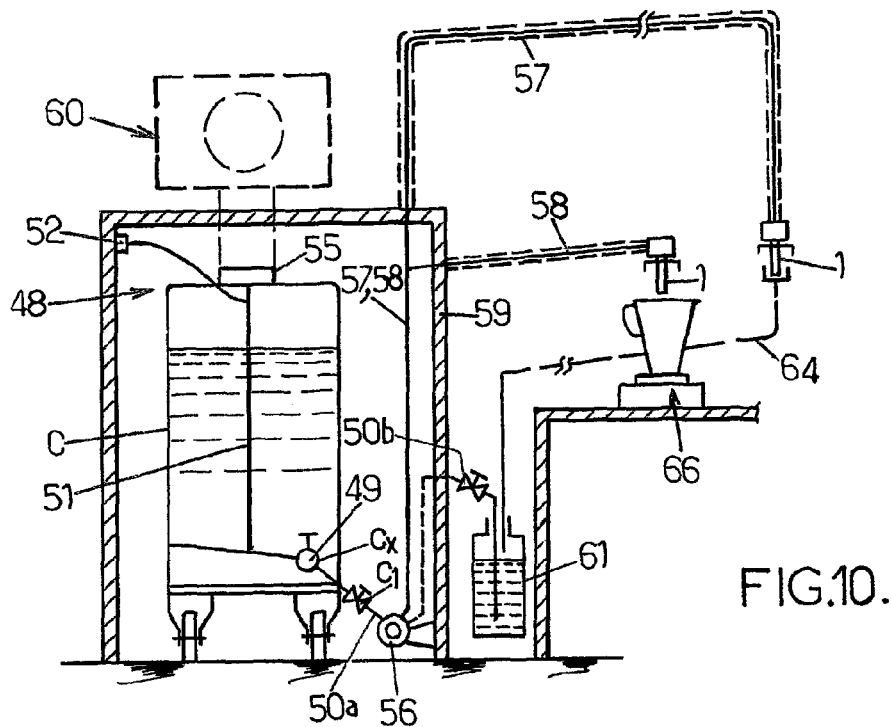
FIG. 10 is a front sectional schematic view showing an installation for dispensing a liquid product integrating a valve for metering the product according to the invention.
Figure 11:
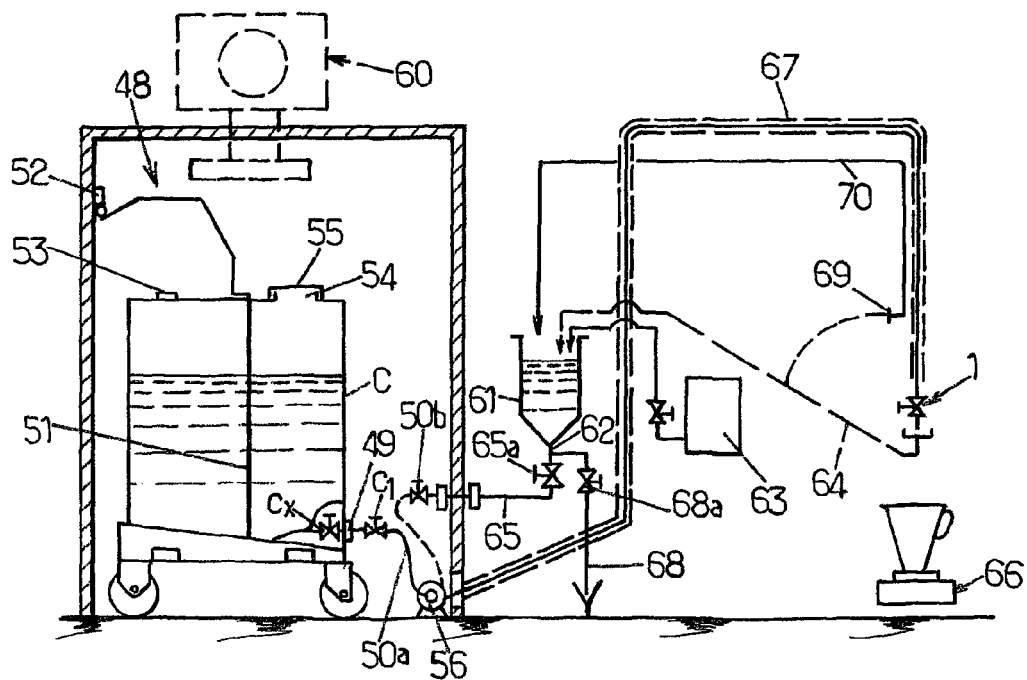
FIG. 11 is a schematic view of an alternative embodiment of a liquid product dispensing installation integrating a metering valve according to the invention.

FIGS. 10 and 11 schematically illustrate a product dispensing installation integrating a product metering valve according to the invention.

A container C is illustrated, placed in an insulating enclosure 48 capable of maintaining the container at a determined temperature. The installation may comprise other alternative or additional insulating means and suitable for insulating the container such as a cover or a mantle insulating the container.

It is quite understood that in the cases when the liquid product does not need to be kept at a certain temperature, then the container C is not placed in an insulating enclosure 48. Preferentially, the container C has a capacity between 1 and 3,000 liters, preferentially 300 liters, and is of the type with four wheels so as to allow and facilitate its displacement.

The container C is capable of containing a liquid product of the yeast cream type.

The liquid product is drawn by gravity by means of a low orifice 49 of the container C on which is mounted a fixed butterfly valve $C_x$. A flexible pipe 50, or any other type of conduit allowing a liquid product to circulate, comprising a butterfly valve $C_1$, of a type known per se, is also provided in order to be advantageously used as a connection to the fixed butterfly valve $C_x$, the flexible pipe 50 then being in the position 50a illustrated in solid lines in the figures.

The container C is advantageously provided with a low level probe 51 notably an electrode and with a device 52 capable of emitting a warning or alarm signal.

A purger or vent 53 may also be provided passing through the top of the container C, the vent 53 allowing the container C to be maintained at atmospheric pressure.

The container C may also comprise an inspection hole 54 closed by a lid 55 intended for inspecting the container C, notably after cleaning the container C.

Advantageously, the insulating enclosure 48 defines a cold room at a preferential temperature comprised between −1° C. and +10° C., advantageously about 4° C., intended to receive one or several containers C.

Provision is made for a pump 56 connected to the flexible conduit 50 from the low orifice 49 of the container C. The pump 56 is advantageously placed under the lower level of the container C so as to ensure priming of the pump 56 by a gravitational effect.

The device 52 capable of emitting a warning or alarm signal for example emits at least one light signal and possibly a signal ordering the stopping of the pump 56, when the product level in the container C is a minimum.

During the starting of the pump 56, the butterfly valves $C_1$ and $C_x$ are opened and the flexible pipe 50 in the position 50a connects the valve $C_x$ of the container C to the pump 56.

The liquid product from the container C and from the pump 56 is brought via a raised conduit 57 connected to the pump 56 right up to the metering valve 1 according to the invention. Advantageously, the raised conduit 57 raises the liquid product right up to a level higher than the roof of the container C before bringing it back to a lower but higher level than the container C. The raised conduit 57 may be provided passing through the roof of the insulating enclosure 48.

Alternatively, a low conduit 58 connected to the pump 56 is provided, passing through one of the sides 59 of the insulating enclosure 48, the low conduit 58 leading to the metering valve according to the invention 1.

The raised conduit 57 and the low conduit 58 have a common portion in the insulating enclosure 48 and a portion outside the enclosure which may be provided with a heat insulator of a type known per se, when the flowing liquid product is subject to temperature constraints. It is understood that the installation is advantageously made with either exclusively the raised conduit 57 or exclusively the low conduit 58.

It is thereby possible to place the metering valve 1 in a determined location and at a specific distance from the insulating enclosure 48 depending on whether the conduit 57, 58 from the pump 56 passes through one of the sidewalls 59 or the roof of the insulating enclosure 48. Consequently, it is possible to take into account the bulkiness of the storage location of the enclosure 48 or of the container C in order to determine the location for dispensing the liquid product provided by the metering valve 1.

Optionally, when the products are subject to temperature constraints for their preservation, and in order to cool the insulating enclosure 48 so that it has the function of a cold room, cooling means 60 of the refrigerating unit type known per se, are provided above the insulating enclosure 48.

The pump 56 is a pump with which the product may be withdrawn from the container C and pumped back either into the raised conduit 57 or the low conduit 58, the pump 56 being capable of ensuring the flow of the product in the raised 57 or low 58 conduit, preferentially at a rate comprised between 0.1 and 1 m/s. The pump 56 may have a variable rate so that it is able to provide circulation of a cleaning solution in either the high 57 or low 58 conduits, at a rate larger than 1 m/s, so as to achieve efficient cleaning of the conduits 57, 58.

The device for cleaning the conduits 57, 58 comprises a reservoir 61 of cleaning solution.

Figure 12:
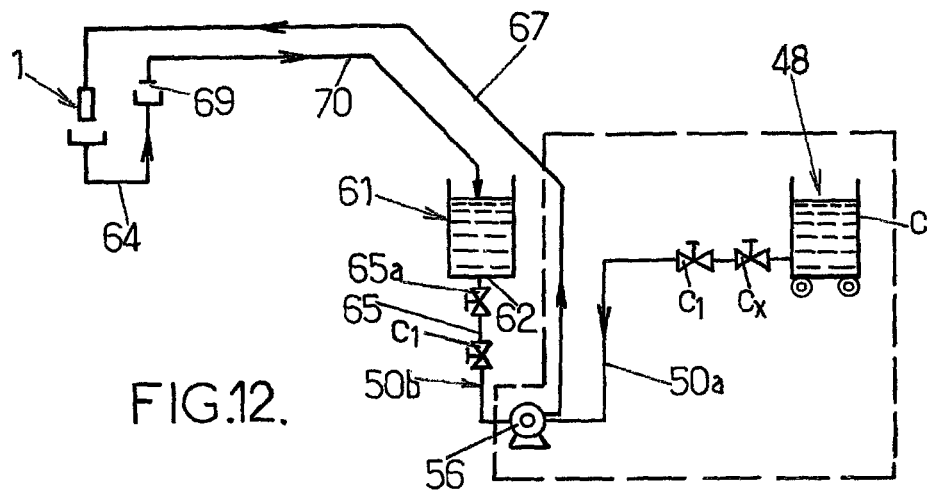
FIG. 12 is a schematic simplified view of a product dispensing installation integrating a metering valve according to the invention and as illustrated in FIG. 11.

Advantageously, and as illustrated in FIGS. 11 and 12, the reservoir 61 contains the cleaning solution and may be fed with water from a water source 63. Currently, the reservoir is manually fed with pure cleaning solution, nevertheless it is also possible to provide means for automatically dispensing the cleaning solution into the reservoir 61.

The cleaning solution may be prepared in the reservoir 61 from a bactericidal disinfecting cleaning agent such as for example a chlorinated alkaline agent of the Neophoschloro type.

In order to allow the formation of a loop for cleaning the conduits 57, 58, provision is made for screwing in or snapping in a flexible pipe 64 for connecting the lower end 19 of the sleeve of the metering valve 1 and for connecting it to the reservoir 61.

According to this first embodiment of an installation for metering a liquid product, the conduits 57 or 58, as well as the valve 1 which are used for metering the liquid product are cleaned by forming a cleaning loop.

More specifically, if the user wishes to clean either the raised 57 or the low 58 conduit, he should connect a connecting pipe 64 to the end of the metering valve 1 according to the invention, the connecting pipe 64 being of length such that its end is capable of plunging into the cleaning solution reservoir 61.

The outlet butterfly valve $C_x$ of the container C is then closed so that no product can no longer flow out of the container C through the low orifice 49. The flexible pipe 50 comprising the butterfly valve $C_1$ is then connected to the reservoir 61 (the position 50b illustrated in dotted lines in FIG. 11) possibly via another conduit 65.

The pump 56 is then started so that the cleaning solution is sucked up from the reservoir 61 via the discharge conduit 65, the cleaning solution is then pumped back into the raised conduit 57 or into the low conduit 58.

A loop for cleaning the conduits 57, 58 is thereby obtained, in which the cleaning solution flows.

According to a preferential embodiment, operation of the pump 56 will be actuated by the displacements of actuation means, notably the lever 29 with which the valve 1 may be opened into the open position.

Means for receiving 66 the liquid product to be metered, preferentially yeast cream, are also provided at the outlet of the metering valve 1, these receiving means 66 allowing the amount of discharged product to be measured, either by weighing this amount of product, or by measuring its volume. The amount of product to be metered may also be determined by a flowmeter provided at the outlet of the valve 1.

According to the particularities of the embodiment illustrated in FIG. 11, a conduit 67, optionally coated with a heat insulator, is provided between the pump 56 and the metering valve 1 according to the invention.

Like in the embodiment corresponding to FIG. 10, a connecting pipe 64 is also provided between the metering valve 1 and the reservoir 61 of cleaning solution.

A discharge conduit 65 is also provided connected to the discharge port 62 at the bottom of the cleaning solution reservoir 61 and having a connector onto which the flexible pipe 50b itself connected to the pump 56 is able to be connected.

Provision is also made for a bypass conduit 68 on the conduit 65 at the outlet of the reservoir 61 of the cleaning solution, with which the contents of the reservoir 61 may be purged and discharged. In order to allow the solution from the reservoir 61 to pass into one of the conduits 65, 68, a valve 65a, 68a is respectively provided on each of the conduits 65, 68, providing passage for the cleaning solution into one of the conduits 65, 68.

The connecting pipe 64 between the metering valve 1 and the reservoir 61 is either totally independent of the conduit 67 connecting the pump 56 to the metering valve 1, or partially integrated into this conduit 67 by means of a connector 69 on a conduit 70 partially integrated into the heat insulator of the conduit 67 from the pump 56, or partially bordering this conduit 67.

It is thereby possible to connect the flexible pipe 64 at the outlet of the metering valve 1 either directly in the cleaning solution reservoir 61, or in a connector 69 of a fixed conduit 70 and optionally, partially common with the product dispensing conduit 67.

The installations as illustrated in FIGS. 10 and 11 may further comprise one or more metering devices mounted in parallel on the conduits 57 and/or 58 or 67. The installation according to FIG. 11 may thus comprise several cleaning loops each including a metering valve. Preferentially, the installation will comprise a single cleaning loop formed by one or more flexible pipes 64 or 70 for cleaning the valves in parallel, said pipes may join before or in the reservoir 61.

FIG. 12 illustrates a simplified schematic view of the formation of a loop for cleaning the conduit by means of a connector 69 of a fixed conduit 70 and partially common to the product dispensing conduit 67.

Thus, in order to form a cleaning loop according to this embodiment, the butterfly valve $C_x$ at the outlet of the container C should be closed and the flexible pipe 50 should be placed in position 50b, i.e., it should be connected to the outlet connector of the discharge conduit 65 (or alternatively be directly connected to the bottom discharge 62 of the cleaning solution reservoir 61). The pump 56 may then be started, a flexible pipe 64 being provided between the outlet of the valve 1 and either connected directly to the cleaning solution reservoir 61 or to a fixed conduit 70 opening out in the cleaning solution reservoir 61.

Figure 13:
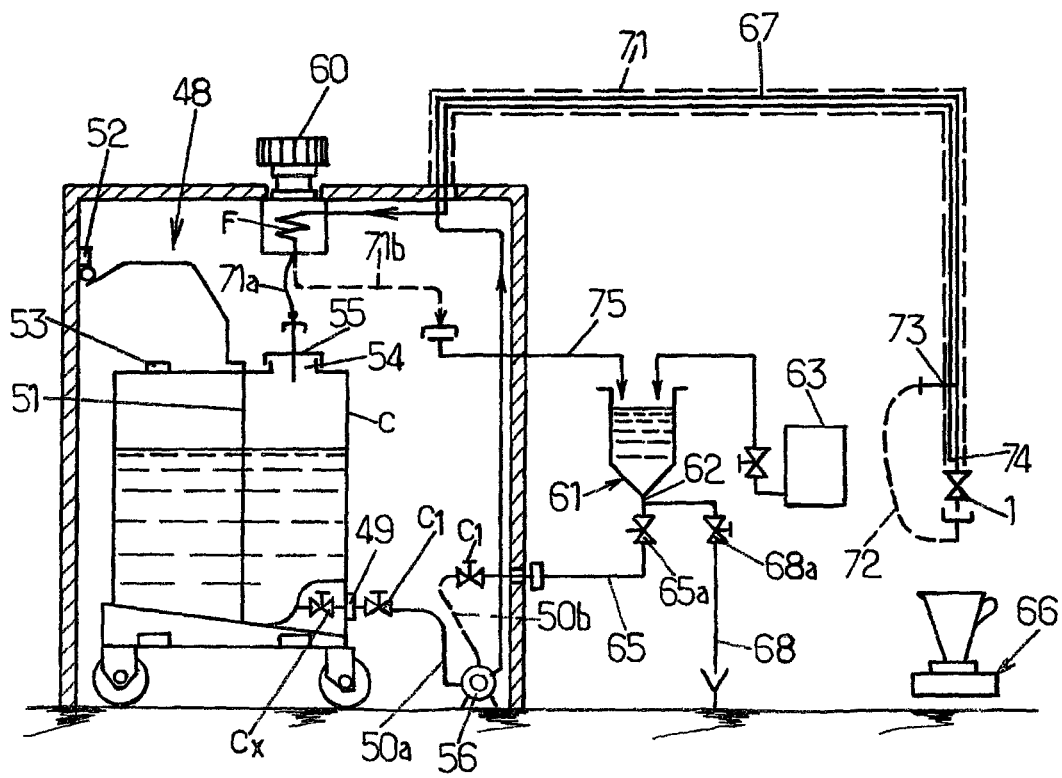
FIG. 13 is a schematic view of an alternative embodiment of a liquid product dispensing installation integrating a metering valve according to the invention.

According to a third embodiment of a product metering installation integrating a metering valve 1 according to the invention and as illustrated in FIG. 13, provision is made for a return conduit 71 in an area of the liquid product dispensing conduit 67 upstream from the metering valve 1 according to the invention.

More specifically, the liquid product dispensing conduit 67 has a connection 74 before the end of the conduit 67 on which the metering valve 1 is attached and from which the return conduit 71 originates. A particular embodiment of this connection 74 will be described later on.

Advantageously, the return conduit 71 passes through the insulating enclosure 48 (when the latter is present) as well as refrigerating means F, before opening out either in the container C, through the aperture 54 and the lid 55 of the container (the end of the return conduit 71 is then in position 71a), or in a secondary conduit 75 itself opening out in the cleaning solution reservoir 61 (the end of the return conduit 71 is then in position 71b), the switching from position 71a to position 71b and vice versa being obtained by manual handling or automatically. Alternatively, it is possible to provide a valve at the outlet of the refrigerating means F with which the circulating product may be rejected into the container C or into a conduit opening out in the cleaning solution reservoir 61.

Preferentially, the refrigerating means F appear as a coil connected to Peltier elements of a type known per se.

Thus, cooling of the product to be metered may be carried out by circulating the liquid product to be metered as a loop through the refrigerating means F in the installation.

It is obvious that such refrigerating means F may be omitted in installations intended for metering products which do not require storage at low temperature.

According to a preferential embodiment, the operation of the pump will be actuated by the displacement of the actuation means, notably the lever 29 allowing the valve 1 to be opened into the open position.

A flexible connecting pipe 72 is provided between the metering valve 1 according to the invention and a connection point 73 provided on the return conduit 71.

According to this mode of operation, the pump 56 may operate continuously or, in order to avoid overheating phenomena, batchwise for example with a stopping time equivalent to the operating time. According to a first alternative, a loop is formed in which the liquid product contained in the container C flows. In this scenario, the product circulates in the conduit 50 in position 50a from the container C, passes through the pump 56 and then into the conduit 67. The product is discharged by the metering valve 1 if the latter is in the open position. In the opposite case, the product starts off again into the container through the return conduit 71 in position 71a. A loop for circulating the product contained in the container C is thereby formed and the product to be metered may be cooled during its passing into the refrigerating means F if the latter are present.

Preferentially, with a sensor which senses the "non operational" position of the valve 1, notably a detector of the position of the lever 29 in the oblong hole 33, operation of the pump 56 may be prevented for example when the lever 29 is completely lowered during a halt of the installation or when the valve 1 is not positioned in the installation, notably when it has to be removed for cleaning.

According to a second alternative, a cleaning solution loop is formed, the outlet butterfly valve $C_x$ of the container is then closed and the flexible pipe 50 is connected in position 50b. In this scenario, the cleaning solution is discharged by the conduit 65 provided at the bottom of the cleaning solution reservoir 61 and connected to the pump 56, the cleaning solution then flows into the conduit 67 and then into the return conduit 71 as well as into the connecting pipe 72 before being discharged into the return conduit 71. The solution is then discharged by the conduit 71 in position 71b which is connected to the secondary conduit 75 itself opening out in the cleaning solution reservoir 61. Because of the presence of a flexible pipe 72 at the outlet of the valve 1, a cleaning loop is obtained, allowing the valve 1 to be cleaned.

Figure 14:
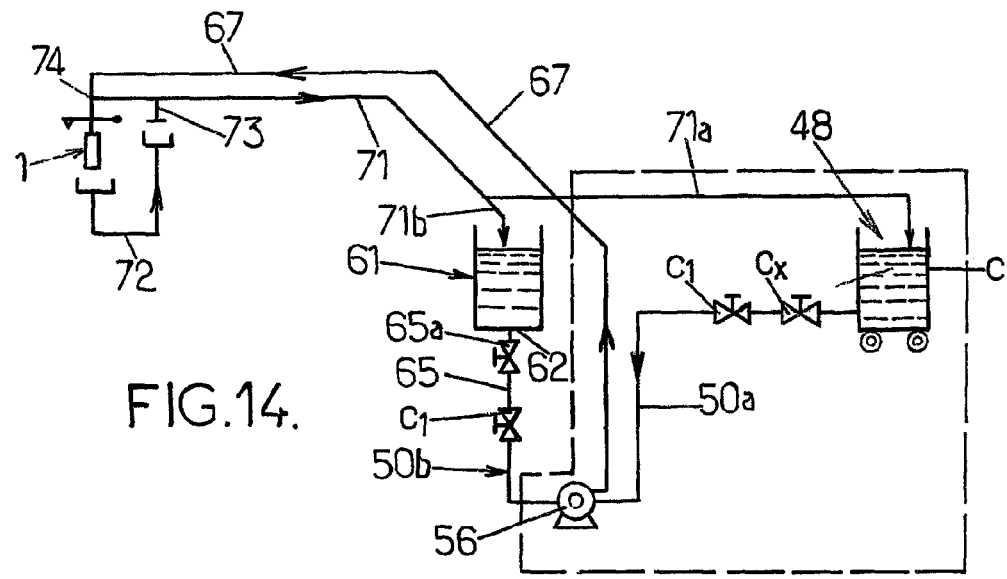
FIG. 14 is a schematic simplified view of a product dispensing installation integrating a metering valve according to the invention and as described in FIG. 13.

FIG. 14 more schematically illustrates the different loops for circulating the liquid product and the cleaning solution obtained from the installation illustrated in FIG. 13.

Figure 15:
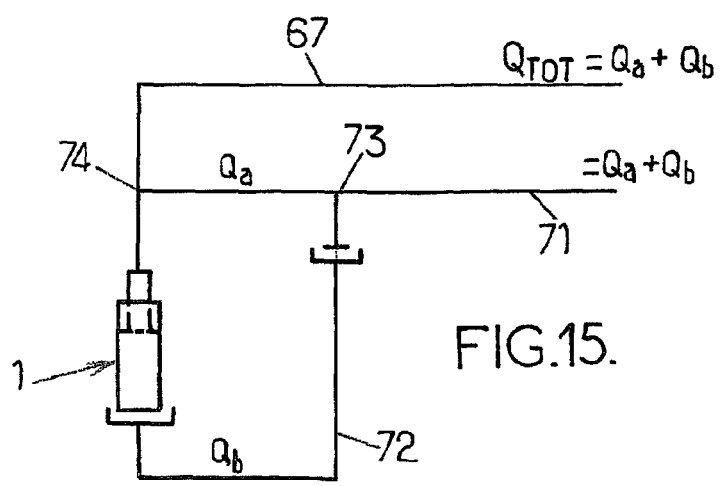
FIG. 15 is a schematic illustration of the flows in the product circulation loop of the installation as illustrated in FIG. 13.

FIG. 15 illustrates the different flows circulating in the installation for dispensing the cleaning product, incorporating a return conduit 71 on which a connecting pipe 72 connected to the outlet of the metering valve 1 according to the invention is able to be connected.

A first flow Qtot circulates in the conduit 67 connecting the pump 56 to the metering valve 1.

A second return conduit 71 is then provided from a connection point 74 on the conduit 67 connecting the pump 56 to the metering valve 1, the connection point 74 being located upstream from the metering valve 1.

Provision is made for a flow Qa flowing at the outlet of the connection point 74 into the return conduit 71, a flow Qb flowing through the metering valve 1.

Such an installation as illustrated in FIG. 13 may further comprise one or more connections 74 successively positioned along the conduit 67, each connection 74 opening out on a metering valve. The pipe 71 downstream from the last connection 74 brings the liquid product to be metered back to the container. Preferentially, the installation is such that each metering device may be individually cleaned as explained earlier via a flexible connecting pipe 72 and a connection point 73 downstream from the connection 74.

An installation comprising several metering valves which may be cleaned in series in a cleaning loop is particularly advantageous notably in that the tubing and valves may be cleaned in a single go with a same cleaning flow.

The flexible connecting pipe 72 is provided for connecting the outlet of the metering valve 1 to a connection point 73 on the return conduit 71. A flow Qtot corresponding to the sum of Qa and Qb is then obtained after this connection point. Thus, during the formation of a cleaning solution loop, the cleaning solution flows in the different conduits and allows them to be cleaned, as well as the metering valve 1.

Advantageously, any type of connecting means 15 between a metering valve 1 according to the invention and a flexible connecting pipe capable of connecting the metering valve 1 to the cleaning solution reservoir 61 or to a connection point 69 of a conduit 70 or to a connection point 73 of a conduit 71, is provided, for example means for a snap-on connection of the end of the pipe in a sleeve surrounding the end of the metering valve 1, by a snap-on mechanism, by forming a connection of the bayonet type, by screwing or by any other means of a type known per se.

Advantageously, the connecting means appear as a sleeve capable of being fitted onto the lower end 19 of the sleeve 15 of the metering valve 1 instead of the plug 38 as described earlier.

Figure 16:
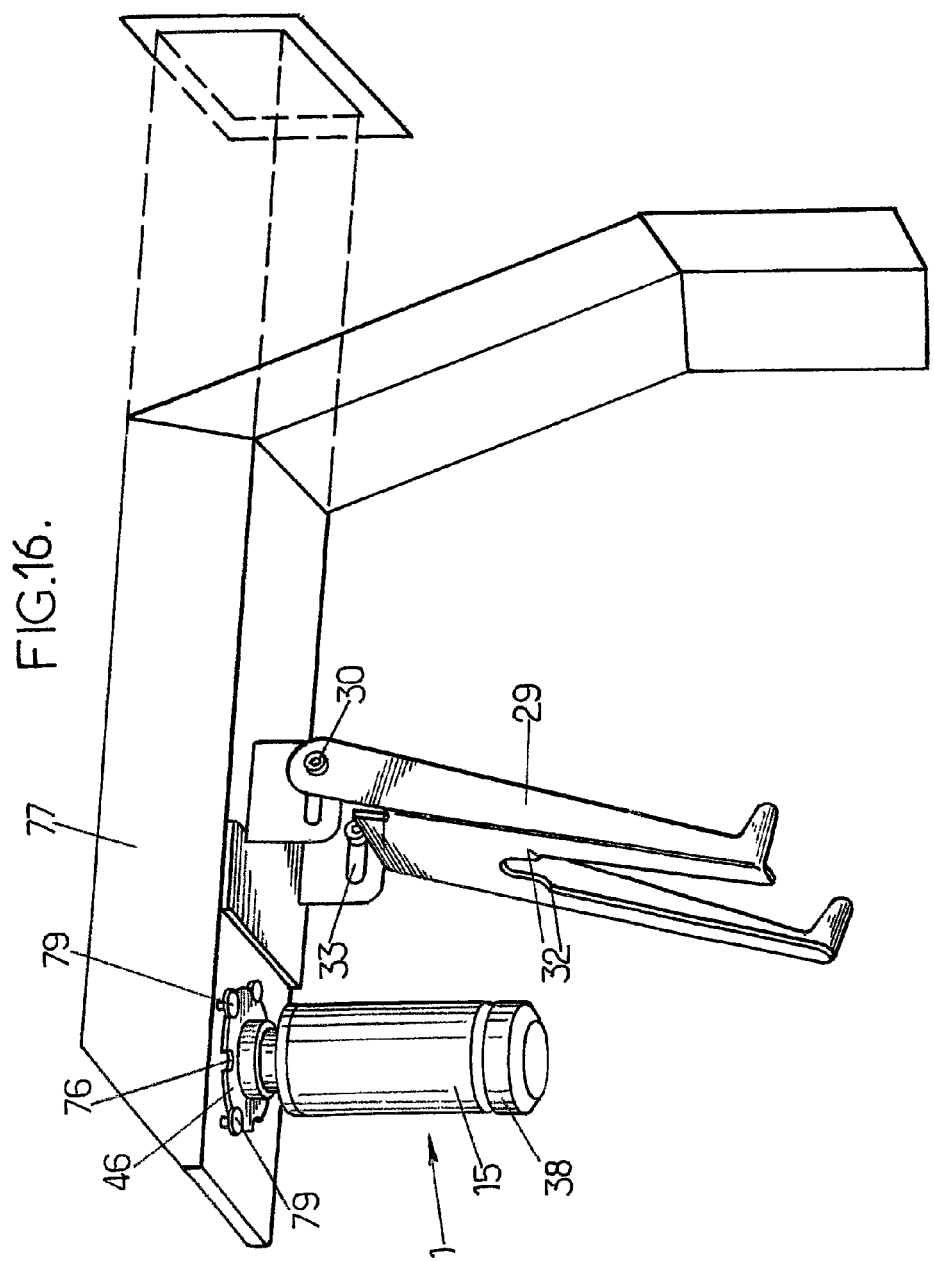
FIG. 16 is a schematic perspective view of an alternative embodiment of a valve according to the invention.

FIGS. 16 and 17 are respectively perspective and sectional views of an embodiment of a valve according to the invention having a collar 46 with a plurality of notches 76.

According to this embodiment, the valve 1 is made integral with a supporting arm 77 including an orifice 78 into which the endpiece of the valve 1 is able to engage. A plurality of protruding screw heads 79 is provided on the lower surface of the supporting arm 77. Advantageously, as many notches 76 on the collar 46 are provided as there are screw heads 79. Thus, in order to make the valve 1 integral with the supporting arm 77, the endpiece 6 should be driven into the orifice 78 of the supporting arm 77, and the screw heads 79 should then be placed facing the notches 76 so that the collar 46 may be applied against the lower surface of the supporting arm 77. The valve 1 then needs to be pivoted on its own axis so that the notches 76 are no longer facing the screw heads 79. The collar is then blocked in the space between the lower surface of the supporting arm 77 and the screw head 79. A spring button 80 of a type known per se, is advantageously provided so as to block the rotation on its own axis of the valve 1, once the collar 46 is applied against the lower surface of the supporting arm 77, the notches 76 are no longer facing the screw heads 79, and a notch 76 is blocked against the spring button 80. The spring button 80 should then be pressed in order to unblock the collar 46 and allow its rotation around its own axis and thus disengagement of the valve 1 from the supporting arm 77.

The connection 74 between the product feed conduit 67 and the return conduit 71 advantageously appears as a one-piece part 82 in which the endpiece 6 of the valve 1 accommodates with an axial orifice 83 into which the product supply conduit 67 opens out as well as the return conduit 71.

The invention is not limited to the embodiments which have just been presented. Various alternatives may be devised.

In particular, the valve may be directly actuated, i.e., without resorting to a lever. For example it would be sufficient, according to the use for which it is intended, to provide it with gripping means (for example radially protruding lugs) with which the sleeve 15 may be directly slid relatively to the conduit 5.

The invention claimed is:

1. A valve for metering a liquid or powdery product, which comprises:
   a fixed conduit for feeding the product, which has an upper end conformed as an end piece for its connection to tubing for bringing in the product, and a lower end for dispensing the product, this conduit defining at its lower end, an aperture for letting through the product;
   a closure member positioned at the lower end of the conduit;
   a coaxial sleeve mounted on the outside of the conduit, which has a lower end conformed as a valve seat, this sleeve delimiting together with the conduit, at its lower end, a chamber into which said aperture opens out, said sleeve being translationally displaceable relatively to the conduit between a closed position in which the valve seat tightly cooperates with the closure member, and an open position in which the valve seat is spaced apart from the closure member in order to allow the product to flow, wherein said chamber is delimited firstly by the valve seat, and secondly by a seal ring interposed between the conduit and the sleeve thereby allowing for the chamber to be filled with pressurized fluid
   and wherein said seal ring is interposed between the conduit and the sleeve so as to provide tightness for all relative positions between the conduit and the sleeve.

2. The valve according to claim 1, wherein the valve seat is frusto-conical.

3. The valve according to claim 1, wherein the closure member is of a hemispherical shape.

4. The valve according to claim 1, wherein the closure member is of a conical or frusto-conical shape.

5. The valve according to claim 1 wherein the closure member is made in an elastomeric material.

6. The valve according to claim 1, wherein a restoring spring permanently urges the sleeve towards its closed position.

7. The valve according to claim 1, which comprises a bayonet mechanism ensuring blocking of the sleeve in the open and/or closed position.

8. The valve according to claim 7, wherein said bayonet mechanism comprises a lug which cooperates with an angled groove.

9. A device for metering a liquid or powdery product, which comprises:
   a valve for metering the liquid or powdery product, which comprises:
   a fixed conduit for feeding the product, which has an upper end conformed as an endpiece for its connection to tubing for bringing in the product, and a lower end for dispensing the product, this conduit defining at its lower end, an aperture for letting through the product;
   a closure member positioned at the lower end of the conduit;
   a coaxial sleeve mounted on the outside of the conduit, which has a lower end conformed as a valve seat, this sleeve delimiting together with the conduit, at its lower end, a chamber into which said aperture opens out, said sleeve being translationally displaceable relatively to the conduit between a closed position in which the valve seat tightly cooperates with the closure member, and an open position in which the valve seat is spaced apart from the closure member in order to allow the product to flow wherein said chamber is delimited firstly by the valve seat, and secondly by a seal ring interposed between the conduit and the sleeve thereby allowing for the chamber to be filled with pressurized fluid, and;

means for actuating said valve and wherein said seal ring is interposed between the conduit and the sleeve so as to provide tightness for all relative positions between the conduit and the sleeve.

10. The device according to claim 9, wherein said means for actuating said valve comprise:

a fixed plate, and an actuation lever, pivotally mounted on the plate and which cooperates with the sleeve in order to control its displacement relatively to the conduit.

11. The device according to claim 10, wherein the plate is provided with means for positioning the valve.

12. The device according to claim 11, wherein the lever has a flared notch allowing the conduit to be introduced for positioning the end piece relatively to the plate.

13. The device according to claim 12, wherein said lever may adopt a non operational position in which it is spaced apart from the sleeve.

14. A machine for dispensing a liquid or powdery product, which comprises:

a fixed structure provided with a compartment, an interchangeable reservoir, positioned in said compartment and containing said product, this reservoir being provided with tubing for the flow of the product, and a metering device for metering a liquid or powdery product comprising a valve for metering the liquid or powdery product, said valve comprising:

a fixed conduit for feeding the product, which has an upper end conformed as an end piece for its connection to said tubing for bringing in the product, and a lower end for dispensing the product, this conduit defining at its lower end, an aperture for letting through the product;

a closure member positioned at the lower end of the conduit;

a coaxial sleeve mounted on the outside of the conduit, which has a lower end conformed as a valve seat, this sleeve delimiting together with the conduit, at its lower end, a chamber into which said aperture opens out, said sleeve being translationally displaceable relatively to the conduit between a closed position in which the valve seat tightly cooperates with the closure member, and an open position in which the valve seat is spaced apart from the closure member in order to allow the product to flow, wherein said chamber is delimited firstly by the valve seat, and secondly by a seal ring interposed between the conduit and the sleeve thereby allowing for the chamber to be filled with pressurized fluid; and the machine further comprises means for actuating said valve, wherein in said machine, the valve is connected to said reservoir, its conduit being connected to the tubing via its end piece, whereas the actuation means are mounted on the fixed structure, and said metering valve being connected to said reservoir.

15. A machine for dispensing a liquid or powdery product, which comprises:

a fixed structure provided with a compartment and having a notch for introducing a valve for metering a liquid or powdery product, said valve comprising:

a fixed conduit for feeding the product, which has an upper end conformed as an end piece for its connection to tubing for bringing in the product, and a lower end for dispensing the product, this conduit defining at its lower end, an aperture for letting through the product;

a closure member positioned at the lower end of the conduit;

a coaxial sleeve mounted on the outside of the conduit, which has a lower end conformed as a valve seat, this sleeve delimiting together with the conduit, at its lower end, a chamber into which said aperture opens out, said sleeve being translationally displaceable relatively to the conduit between a closed position in which the valve seat tightly cooperates with the closure member, and an open position in which the valve seat is spaced apart from the closure member in order to allow the product to flow, wherein said chamber is delimited firstly by the valve seat, and secondly by a seal ring interposed between the conduit and the sleeve thereby allowing for the chamber to be filled with pressurized fluid; and the machine farther comprises an interchangeable reservoir, positioned in said compartment and containing said product, this reservoir being provided with to said tubing for the flow of the product, and a metering device, wherein the metering device comprises said valve, means for actuating said valve, the means for actuating said valve comprising:

a fixed plate, and an actuation lever, pivotally mounted on the plate and which cooperates with the sleeve in order to control its displacement relative to the conduit wherein in said machine, the plate is mounted on the fixed structure in the vicinity of the notch, wherein the valve is set into place on the fixed structure, the valve being positioned in the notch and connected to said reservoir, its conduit being connected to the tubing via its end piece, and said metering valve being connected to said reservoir.

16. An installation for dispensing a liquid product including:

a container containing said liquid product;

means for dispensing a liquid product connecting the container to a metering valve, said valve comprising:

a fixed conduit for feeding the product, which has an upper end conformed as an end piece for its connection to tubing for bringing in the product, and a lower end for dispensing the product, this conduit defining at its lower end, an aperture for letting through the product;

a closure member positioned at the lower end of the conduit;

a coaxial sleeve mounted on the outside of the conduit, which has a lower end conformed as a valve seat, this sleeve delimiting together with the conduit, at its lower end, a chamber into which said aperture opens out, said sleeve being translationally displaceable relatively to the conduit between a closed position in which the valve seat tightly cooperates with the closure member, and an open position in which the valve seat is spaced apart from the closure member in order to allow the product to flow wherein said chamber is delimited firstly by the valve seat, and secondly by a seal ring interposed between the conduit and the sleeve thereby allowing for the chamber to be filled with pressurized fluid;

and wherein said seal ring is interposed between the conduit and the sleeve so as to provide tightness for all relative positions between the conduit and the sleeve, and the installation further comprises:

a pump with which the liquid product may be withdrawn from the container and said liquid product may circulate in the liquid product dispensing means, and a metering device comprising said metering valve, and means for actuating said valve, and said metering valve being connected to said pump being connected to said container.

17. The metering installation according to claim 16, characterized in that it comprises a reservoir with a cleaning solution capable of cleaning said means for dispensing a liquid.

18. The metering installation according to claim 17, characterized in that said means for dispensing a liquid product comprise a return conduit starting upstream from the metering valve and opening out either into the container, or into a secondary conduit which opens out in said cleaning solution reservoir.

19. The metering installation according to claim 17, characterized in that it comprises a flexible connecting tube capable of connecting said valve to the cleaning reservoir.

20. The metering installation according to claim 19, characterized in that said flexible connecting pipe opens out in said cleaning solution reservoir.

* * * * *